(12) United States Patent
Futaki et al.

(10) Patent No.: US 10,412,622 B2
(45) Date of Patent: Sep. 10, 2019

(54) MOBILE RADIO COMMUNICATIONS NETWORK CONGESTION

(71) Applicant: NEC Corporation, Tokyo (JP)

(72) Inventors: Hisashi Futaki, Tokyo (JP); Caroline Jactat, Berkshire (GB); Vivek Sharma, Berkshire (GB)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/023,779

(22) PCT Filed: Aug. 27, 2014

(86) PCT No.: PCT/JP2014/004397
§ 371 (c)(1),
(2) Date: Mar. 22, 2016

(87) PCT Pub. No.: WO2015/045274
PCT Pub. Date: Apr. 2, 2015

(65) Prior Publication Data
US 2016/0234715 A1    Aug. 11, 2016

(30) Foreign Application Priority Data
Sep. 25, 2013   (GB) .................................. 1317036.0

(51) Int. Cl.
*H04L 12/26*   (2006.01)
*H04W 28/02*   (2009.01)
*H04W 48/06*   (2009.01)

(52) U.S. Cl.
CPC ... *H04W 28/0289* (2013.01); *H04W 28/0268* (2013.01); *H04W 48/06* (2013.01)

(58) Field of Classification Search
CPC ............. H04W 28/0289; H04W 48/06; H04W 28/0268
(Continued)

(56) References Cited

U.S. PATENT DOCUMENTS

2008/0031212 A1   2/2008   Ogura
2010/0265823 A1   10/2010  Zhao et al.
(Continued)

FOREIGN PATENT DOCUMENTS

GB   2485233      5/2012
JP   2008-42451   2/2008
(Continued)

OTHER PUBLICATIONS

NTT Docomo, Inc., "Requirement and Way forward for SSAC in Connected", 3GPP TSG-RAN2#83, R2-132758, pp. 1-8, Aug. 2013.
(Continued)

*Primary Examiner* — Mang Hang Yeung
(74) *Attorney, Agent, or Firm* — Finnegan, Henderson, Farabow, Garrett & Dunner, L.L.P.

(57) ABSTRACT

The invention provides for a method of easing congestion in a mobile radio communications network including the step of applying access restriction at a mobile radio communications user terminal device towards the network and on the basis of bearer characteristics such as new or ongoing bearer, bearer quality of service, bearer type and or bearer class, and the access restrictions being controlled by the network e.g. the Radio Access Network such as via an eNodeB or the Core Network.

25 Claims, 6 Drawing Sheets

(58) Field of Classification Search
USPC .......................................................... 370/230
See application file for complete search history.

(56) References Cited

U.S. PATENT DOCUMENTS

| | | | |
|---|---|---|---|
| 2011/0141908 A1* | 6/2011 | Ishida | H04W 48/02 370/241 |
| 2011/0235569 A1* | 9/2011 | Huang | H04W 28/02 370/315 |
| 2013/0194998 A1* | 8/2013 | Susitaival | H04W 68/02 370/312 |
| 2015/0036489 A1* | 2/2015 | Rajadurai | H04W 28/0205 370/230 |

FOREIGN PATENT DOCUMENTS

| | | |
|---|---|---|
| JP | 2009-105758 | 5/2009 |
| JP | 2012-524463 | 10/2012 |
| JP | 2013-62619 | 4/2013 |
| JP | 2015-015562 | 1/2015 |
| WO | WO 2010/018658 | 2/2010 |
| WO | WO 2013/141600 A1 | 9/2013 |

OTHER PUBLICATIONS

3GPP TS 36.331, V10.11.0, $3^{rd}$ Generation Partnership Project; Technical Specification Group Radio Access Network; Evolved Universal Terrestrial Radio Access (E-UTRA); Radio Resource Control (RRC); Protocol specification (Release 10), Sep. 2013.

NTT Docomo, "WID proposal for Application and Service Access Control", 3GPP TSG-SA WG1 #61, S1-131291, Feb. 2013.

LG Electronics, Inc., "New Study Item Description: Smart Congestion Mitigation in E-UTRAN", 3GPP TSG-RAN Meeting#60, RP-130870, Jun. 2013.

Search Report in corresponding British Application No. GB 1317036.0 dated Feb. 17, 2014.

International Search Report and Written Opinion dated Dec. 2, 2014 in corresponding PCT International Application.

Notification of Reasons for Refusal dated Jun. 5, 2018, by Japanese Patent Office in counterpart Japanese Patent Application 2016-517567.

3GPP TSG-RAN WG2#80 R2-125529, "Smart Congestion Mitigation in E-UTRAN" Nov. 12-16, 2012.

Notification of Reasons for Refusal dated Sep. 11, 2018, issued by the Japanese Patent Office (JPO) in counterpart Japanese Patent Application No. 2016-517567.

* cited by examiner

MOBILE RADIO COMMUNICATIONS NETWORK CONGESTION

CROSS-REFERENCE TO RELATED PATENT APPLICATIONS

This application is a National Stage Entry of International Application No. PCT/JP2014/004397, filed Aug. 27, 2014, which claims priority from GB 1317036.0, filed Sep. 25, 2013. The entire contents of the above-referenced applications are expressly incorporated herein by reference.

TECHNICAL FIELD

The present invention relates to a mobile radio communications network, and user and network devices to be used therein, and related methods of operation, seeking to ease network congestion and overload.

BACKGROUND ART

It is currently known to attempt to avoid congestion/overload situations in mobile radio communications networks by employing various forms of network access control for the mobile communication user terminal devices, such as identified as User Equipment (UE), which are active under network coverage.

The proliferation of the number of UE devices in the form of so-called smart phones under network coverage, and which are generally retained in an "always on" state, greatly increases the probability of each such UE device remaining in an RRC_Connected mode. This disadvantageously serves to make access control less effective since such known control is only applicable to UE devices in RRC_Idle mode.

In the absence of any such effective access control, the network, once experiencing an overloaded/comgested state is highly likely to remain in such a state and, indeed with the proliferation of RRC_Connected mode smart phones, to become even more overloaded/congested.

Such an overload situation is further exasperated by users of UE devices who may feel their attempted network access is particularly important, for example for emergency purposes. Such users will repeatedly attempt to achieve their required network communication and thereby repeatedly attempt to send mobile originating traffic from their then RRC_Connected UE devices such that the network is forced to attempt to process the network access request related to that mobile originating traffic. Ultimately, the network reacts by discarding even emergency, and other high priority calls, which of course can prove particularly disadvantageous.

Indeed, it has been recognised that it would be advantageous for the network to control the behaviour of UE devices in connected mode in an attempt to prevent mobile originating signalling and/or data traffic, while any access barring mechanisms might be being applied to the UE devices when in idle mode. Such suggestions have arisen in 3GPP Technical Specification Group focussing on Service and System Aspects—SA1 (S1-131279).

Various attempts have been made to meet this requirement as discussed further below but these are still disadvantageously limited having regard to the problematic scenario outlined above with regard to network congestion and overload and the undesirable barring of emergency and high priority calls.

CITATION LIST

Non Patent Literature

NPL 1: 3GPP TSG-RAN 2#83 (R2-132758)
NPL 2: 3GPP Technical Specification TS 36.331 "Radio Resource Control"
NPL 3: 3GPP work item description "Application Specific Access Control (ASAC)" (S1-131291)
NPL 4: 3GPP RAN2 work item description "Smart Congestion Mitigation" in RP-130870,

SUMMARY OF INVENTION

Technical Problem

Particular suggestions have arisen a 3GPP paper presented byNTT DOCOMO to 3GPP TSG-RAN 2#83 (R2-132758). In a first example, relating to Service Specific Access Control "SSAC in CONNECTED", information from application layers is employed. SSAC allows restriction of IP Multimedia Services (IMS) voice and non-voice calls separately. Access Stratum (AS) necessary information is forwarded to application layers. However the network cannot allow Mobile Originating (MO) IMS voice initiation and prohibit other MO service initiations.

In a second example, Access Control Barring "ACB in CONNECTED" an existing Access Class Barring mechanism is applied to UE access class (UE access class represents a mobile population for PLMN access e.g. UEs dedicated to PLMN Staff, Emergency Services, Public Utilities (e.g. water/gas suppliers), Security Services, For PLMN Use or Specific high priority users have special access class compared to other UEs) and hence does not make any distinction on specific type of traffic.

From 3GPP Technical Specification TS 36.331 "Radio Resource Control", access control for MO signalling/data is only applicable to RRC_Idle or IDLE i.e. when there is no RRC connection between the UE and the radio Access Network (RAN). However, idle mode ACB does not take different bearers into account and is based on access classes stored in SIM. It is not dynamic e.g. some services are free and not operator controlled so an operator may not allow users to access such service at some point in time. Some services may be operator controlled and paid (high priority) and others operator controlled and unpaid (low priority).

With regards to ACB, the network currently cannot know whether UE requests the RRC connection set-up for IMS voice or not. So it is not possible for the network to currently bar IMS voice calls. Accordingly, operators cannot rely on ACB to control congestion, if they deploy IMS voice and bar such service at some point in time.

Further examples of attempts to address the problem are known from Random Access Channel "(RACH) procedure suspension" in which barring information is provided in Medium Access Control (MAC) layer and the access barring performed there. In "RRC Connection Release for group or all UEs", the UEs' RRC connections are released so that they can apply legacy ACB from idle mode. In "Bit rate control (=0) for UE with bearer of QCI=5 (eNB based)", the eNB applies bit rate control to QCI5 (e.g., bit rate=0) to suppress the Session Initiation Protocol (SIP) signaling. This solution is not efficient since the radio access has not been barred beforehand.

Suggestions for access control have arisen in 3GPP work item description "Application Specific Access Control (ASAC)" (S1-131291). Here, application specific congestion control for IMS voice or IMS video communication is applied to heavy congestion scenarios. However, this is not a dynamic mechanism because the UE has to be connected in order to receive the network information to apply them timely when network congestion occurs.

Further suggestions have also arisen in relation to "Network implementation backoff timer for congestion handling". Here UEs initiating IMS voice from IDLE or CONNECTED could experience delay due to such backoff. The backoff can be applied up to 960 ms just for at one time. If backoff is applied a couple of times to UEs, those users could experience cascaded delay, e.g. a few or several seconds, before starting voice calls. Thus, if the network relies on backoff in congestion, some users in IDLE and CONNECTED would experience delay of voice calls. To address this issue some company in 3GPP proposed to have indication in MAC layer that UE is dealing with emergency call or high priority call so that e.g. the RAN does not apply the backoff timer. However there is missing some information for UE to know it has to provide such information i.e. that access is restricted in connected mode.

Yet further, 3GPP RAN2 work item description "Smart Congestion Mitigation" in RP-130870, was also initiated to address the above mentioned access requirements suggested by SA1 and offer a mechanism at radio protocol layers but, again, the subject of this study item still exhibited the above mentioned limitations.

The present invention seeks to provide for a method of network operation and mobile radio communication network elements, and their respective methods of operation, seeking to ease network congestion and having advantages over known such methods and network elements.

Solution to Problem

According to a first aspect of the present invention there is provided a method of easing congestion in a mobile radio communications network including the step of applying access restriction at a mobile radio communications user terminal device towards the network and on the basis of a bearer characteristic.

Preferably, the invention provides for radio access network configuration of the user terminal.

In one example, a radio access barring flag for new bearers can be provided.

In addition, or alternatively, a radio access barring flag from ongoing bearers can be provided.

In any case, an access probability factor can also be provided.

As a further feature the radio access network, as for example embodied by an evolved Node B (eNodeB) receives access restriction activation from the core network or by way of Core Network (CN) configuration or Operative And Maintenance (OAM) configuration.

The method can include delivering the access restriction by way of System Information Block (SIB) or RRC dedicated configuration signalling. Further, the user terminal then determines if its mobile originating signalling/data is related to the said new and/or on-going bearer.

The access probability factor can be compared with a randomly generated number and the deployment of any access restriction controlled on the basis of such comparison.

Advantageously, all access requests pertaining to new bearers and/or on-going bearers, can then be barred so that network congestion is mitigated. However, the aforementioned probability factor can advantageously be employed so as to allow a particular proportion of access request to pass through to be processed by the network even though all, or some, bearer requests are barred.

Advantageously, the user terminal can be arranged to release dedicated radio resources, such as Sounding Reference Signal (SRS), Scheduling Request, Channel Quality Indicator (CQI) and Semi-Persistent Scheduling (SPS) resources, so as to avoid L1 signalling and radio bearer signalling towards the congested network. In another example, network access priority is applied based on the quality of service of the bearers.

The user terminal configuration can be Access Stratum based configuration with radio access network restriction first activated by way of the core network, or by way of the Operative and Maintenance. Advantageously, the access priority can be configured as an access priority bit map based on Quality of service Class Identified (QCI).

As the access stratum then forwards the received access restriction rules according to the access priority bit map to the user terminal Non-Access Stratum.

As an alternative, the access restriction rules in the form of an access priority bit map based on QCI can be delivered directly from the core network to the user terminal non-access stratum.

According to a further feature, the access control towards the radio access network can include the provision of access priority based upon the bearer type as an example, of such different bearer types, the Guaranteed Bit Rate bearer type or a Non-Guaranteed Bit Rate bearer type. The configuration for the access control configuration for the user terminal can comprise Access Stratum based configuration with the radio access network receiving access restriction activation from the core network or from the Operator And Maintenance and the identification of the bearer type then being delivered from the radio access network to the user terminal access stratum for onward delivery to the user terminal non-access stratum.

Again, another alternative exists in which non-access stratum based configuration is conducted directly from the core network by means of identification of the bearer type.

Advantageously, from consideration of bearer quality of service, and respectively bearer type, all of the requests pertaining to bearers depending on such factors are barred so as to mitigate network congestion. For example, the service bearers that are likely most demanding of quality, e.g. voice bearers, or GBR bearers, would be barred from network access.

In a yet further alternative, the access control towards the radio access network is arranged to allow the core network, for example a Mobility Management Entity to provide, configuration towards the user terminal device.

Advantageously, such configuration comprises the assignment of access priority based on bearer class.

Examples of different classes are that the bearers relate to unpaid services or operator controlled services.

Advantageously, the core network delivers a barring indicator based on bearer class to the user terminal non-access stratum by way of the radio access network and in the non-access stratum the network access policies according to the barring indicator are applied to mobile originating signalling/data so as to determine whether the related signalling or data is to be delivered to the user terminal access stratum.

Advantageously, a further level of network access restriction can be provided based upon identification of new and/or ongoing radio bearers in combination with an access probability factor as outlined above.

This further level of access restriction based upon identification of new and/or ongoing bearers and the access probability factor can be arranged to be applied only to access requests allowed through by the user terminal non-access stratum to the user terminal non-access stratum to the user terminal access stratum.

Advantageously, requests pertaining to bearers whose priorities have been lowered by the CN can be barred so that network congestion can be mitigated for, e.g. unpaid or not operator-controlled bearers.

According to another aspect of the present invention there is provided an access control method within a mobile radio communications device for access control towards a radio access network so as to ease congestion within the radio access network, and including the step of attempting access to the network based on a bearer characteristic.

Preferably, the user terminal is arranged for configuration by way of the radio access network.

The method can include the user terminal receiving a radio access barring flag for new radio bearers and/or a radio access barring flag for ongoing bearers, and to determine if its mobile originating signalling/data is related to the new and/or ongoing bearer.

The method within the user terminal can further include the steps of comparing an access probability factor received from the network with a randomly generated number, and controlling the deployment of access restriction on the basis of such comparison.

Advantageously, the method within the user terminal can include steps of releasing dedicated radio resources, such as Sounding Reference Signal (SRS), Scheduling Request, CQI and Semi-Persistent Scheduling (SPS) resources, so as to avoid L1 signalling and radio bearer signalling towards the congested network.

According to a further feature, the method within the user terminal device of achieving access control towards the radio access can include the step determining radio bearer type, such as for example a Guaranteed Bit Rate (GBR) bearer or a Non-Guaranteed Bit Rate (GBR) bearer.

The method within the user terminal device can include AS based configuration, with the radio access network receiving access restriction activation from a Core Network or Operator And Maintenance element, and the identification of the bearer type then being delivered from the radio access network to the user terminal AS for onward delivery to the user terminal Non-Access Stratum (NAS).

As an alternative, the method within the user terminal can include NAS based configuration as conducted directly from the core network by means of identification of the radio bearer type received at the NAS.

The method within the user terminal device can alternatively include steps of receiving at a non-access stratum level an access barring indicator based on bearer class.

Advantageously, the method within the terminal device can include steps of a further level of network access restriction based upon identification of new and/or ongoing radio bearers in combination with an access probability factor as outlined above.

Within the user terminal, this further level of access restriction based upon identification of new and/or on-going bearers, and the access probability factor, can be applied only to access requests allowed through by the user terminal non-access stratum to the user terminal access stratum.

According to yet another aspect of the present invention, there is provided a mobile radio communications user terminal device and arranged for access-control towards a radio access network so as to ease congestion within the radio access network, the user terminal device being arranged for attempting access to the network based on a radio bearer characteristic.

As will be appreciated, the present invention also provides for a mobile radio communications device arranged to operate in accordance with a method as outlined above.

According to another aspect of the present invention there is provided a method within the mobile radio communications network device for controlling access of a mobile radio communications user terminal to a radio access network for easing congestion within the mobile radio communications network and including the step of applying radio network access restriction to the user terminal on the basis of a bearer characteristic.

In one example, a radio access barring flag for new radio bearers can be provided from the network device.

In addition, or alternatively, a radio access barring flag from on-going bearers can be provided from the network device.

In addition, or alternatively, an access probability factor can also be provided for the control of access restriction.

As a particular feature, the method is provided at the radio access network, as for example embodied by an evolved Node B, and further includes the step of receiving access restriction activation from a CN element or OAM element.

The method in the network device can include delivering the access restriction by way of SIB or RRC dedicated configuration signalling.

In another example, the access control includes establishment of network access priority applied based on the quality of service of the radio bearers.

Further, the method can include configuring the access priority as an access priority bitmap based on Quality of service Class Identified (QCI).

According to a further feature of the method within the network device, the access control towards the radio access network can include the provision of access priority based upon the radio bearer type.

Examples of such different bearer types comprise a Guaranteed Bit Rate bearer or a Non-Guaranteed Bit Rate bearer.

In a further alternative, configuration of the access restriction from the network device can comprise assignment of access priority based on radio bearer class.

Examples of different classes are that the radio bearers relate to unpaid services or operator controlled services.

According to yet a further aspect of the present invention, there is provided a mobile radio communications network device arranged for controlling access of a mobile radio communications user terminal to a radio access network for easing congestion within the mobile radio communications network, and arranged to applying radio network access restriction to the user terminal on the basis of bearer characteristic.

Of course, the invention provides for a mobile radio communications network device arranged to operate in accordance with a method as outlined above.

As will therefore be appreciated, the invention is related to access control towards Radio Access Network and particularly to the introduction of new information and new mechanisms allowing:

The Radio Access Network (e.g. evolved NodeB) to configure towards the terminal or User Equipment (UE) with either:

some radio access barring flag to new or/and ongoing bearers and access probability factor; and/or some access priority based on quality of service class. Such information could have been beforehand provided to RAN by Core Network or Operator And Maintenance configuration; and/or some access priority based on bearer type (e.g. GBR or non GBR bearer); and/or The Core Network (e.g. Mobility Management Entity) to configure towards the terminal or User Equipment (UE), some access priority based on bearer class (e.g. bearer for unpaid service or bearer for operator uncontrolled service).

Advantageous Effects of Invention

This all helps achieve control of the radio access of the UE towards the network. In the UE the bearers pertaining to emergency connectivity would not be subject to radio access control. Alternatively network information above comprising bearer quality, and bearer class, would be indicated so as the UE would end up into barring requests for emergency bearers.

BRIEF DESCRIPTION OF DRAWINGS

The invention is described further hereinafter, by way of example only, with the reference to the accompanying drawings in which.

DESCRIPTION OF EMBODIMENTS

Figure 1:
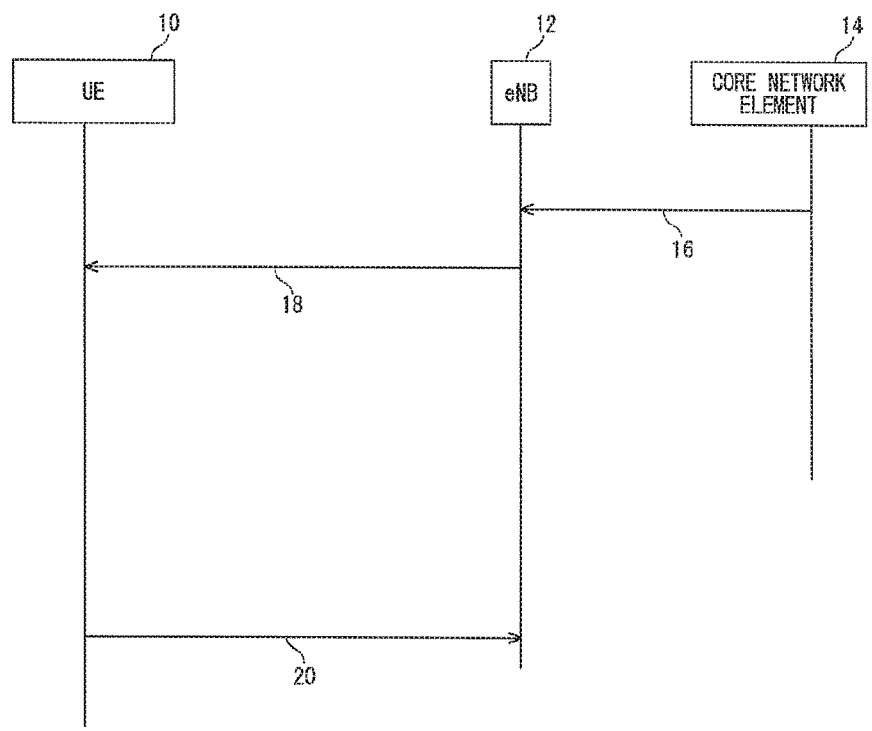
FIG. 1 is a signalling diagram illustrative of network access control according to one aspect of the present invention.

Turning first to FIG. 1, there is provided schematic representation of a user terminal device by which a user can access a mobile radio communications network and, particularly, the user terminal device access stratum 10, a radio access network represented by an evolved NodeB eNB 12 and the representation of a core network or operator and maintenance element 14.

FIG. 1 services in particular to illustrate how network access restriction can be performed depending upon whether the radio bearers concerned are identified as new or ongoing radio bearers.

The procedure commences with a radio access network access restriction activation signal 16 delivered from the core network element 14 to the eNB 12 and which identifies an access be barred to new or ongoing bearers and also suggests an access probability factor.

Should a likely congestion situation be identified within the network, the eNB 12 forwards the access buying factors which are embodied as network policies to the UE 10 so as to activate the required access restrictions.

These network policies are forwarded by the eNB 12 to the UE access stratum 10 by way of an SIB, or RRC dedicated configuration signalling 18. The user terminal, at its access stratum 10 and of course assuming that it is capable and/or subscribed to provide for the required access restriction applies the required network policies in seeking to provided mobile originating signalling/data.

If such mobile originating signalling/data is related to a new, or alternatively ongoing, bearer and such bearers are barred for access in accordance with the policies, then the user terminal will not send the related signalling/data.

If an additional access probability factor is present, the UE can be arranged to generate a random number for comparison with the access probability factor and, responsive to the result of such comparison, the UE can send the related signalling/data.

If access is to be barred, then the UE 10 is arranged to release dedicated resources for SRS, scheduling request, CQI and SPS resources and consider access barred for all the errors. However, if, at the UE 10 all access restriction checks have been passed with no indication of barring required, then a Medium Access Control signal 20 is delivered from the UE 10 to the eNB 12.

Figure 2:
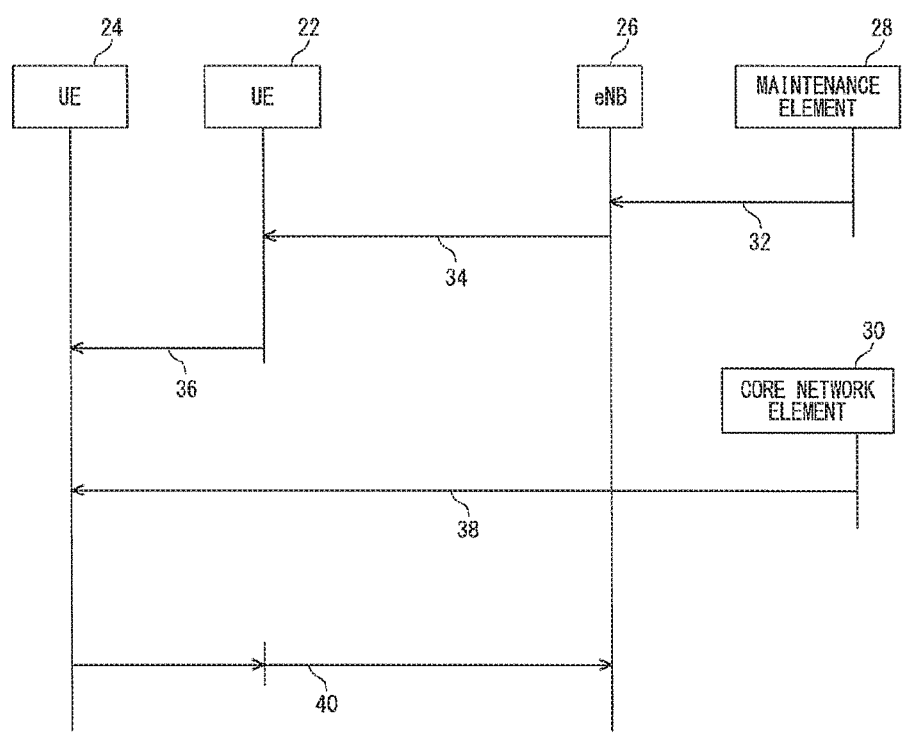
FIG. 2 is a signalling diagram illustrative of network access control according to another aspect of the present invention.

Turning now to FIG. 2 this depicts how access restriction can be performed depending on quality of service of bearers and in the form of a signalling diagram relating to a UE device in-which its AS 22 and NAS 24 are separately indicated and, as before, a radio access network represented by an eNB 26 and a core network or operator and maintenance element 28.

Also illustrated as an option is merely a core network element 30 as described further below.

FIG. 2 in fact illustrates signalling according to a first option comprising access stratum based configuration, a second option comprising non-access stratum based configuration. With regard to the first option, a radio access network access restriction activation signal 32 identifying access priorities based upon QCI is delivered from the core network/operator and maintenance element 28 to the eNB 26. However again, and in case of network congestion having been identified, the eNB 26 forwards the network policies to the UE 22 24 so as to activate access restriction.

The policies are delivered by the eNB 26 to the UE access stratum 22 by way of a SIB or RRC dedicated configuration 34 and which network policies are in the form of an access priority bit map based on QCI. The UE access stratum 22 these received access restriction rules to the UE non-access stratum 24.

As an alternative however, in accordance with the second option illustrated, the core network element 30 can be arranged to deliver non-access stratum access control configuration signalling 38, again comprising access priority bit map based upon QCI, to the UE non-access stratum 24.

In any case, once the UE non-access stratum 24 has received the access priority bit map the network policies represented thereby are checked and replied in relation to mobile originating signalling/data intending to be delivered from the UE from the UE non-access stratum 24.

If such signalling/data is related to radio bearers who's QCI is of a lower priority for access then the related signal/data is not send from the UE non-access stratum 24. As an alternative, the UE non-access stratum 24 can simply be arranged to send higher priority requests before lower priority requests.

Responsive to the manner in which the UE non-access stratum 24 applies the network policies, signalling/data messages are delivered to the UE access stratum 22 for producing an ongoing Medium Access Control signal 40 to the eNB 26.

Concerning, the quality indicators, there are currently 9 QCI values. The "Access priority (AP) bitmap based on QCI" information shown in the Figure hereafter can be implemented as follows.

Option 1** 1 bit encoding of AP: there would be 9 bits AP where e.g. the most significant bit would correspond to QCI 9 and be set to either 0 ("barred") or 1 ("not barred").

Option 2** more than 1 bit encoding of AP e.g. 2 bits for AP [1 . . . 4] value range: there would be one AP encoding for each of 9 QCIs i.e. 18 bits in the AP bitmap where the 2 most significant bits would correspond to QCI 9 and be set to either 00 ("Priority 0 i.e. (100%) barred") or 01 ("Priority 1 e.g. 75% of requests are barred") or 10 ("Priority 2 e.g. 50% of requests are barred") or 11 ("Priority 3 e.g. 25% of requests are barred").

Figure 3:
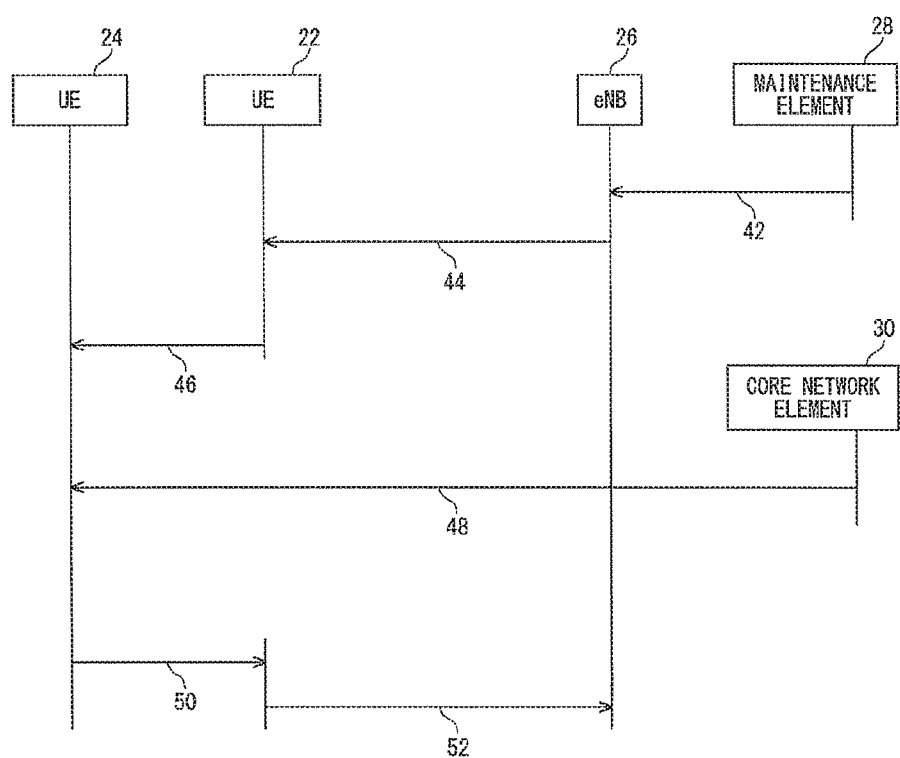
FIG. 3 is a signalling diagram illustrative of network access control according to yet another aspect of the present invention.

Turning now to FIG. 3 there is illustrated a signalling diagram representative of network access restriction performed on the basis of radio bearer type and, in particular, whether the radio bearer comprises a Guaranteed Bit Rate or non-Guaranteed Bit Rate bearer.

The signalling is again illustrated in relation to the UE device of which are separately illustrated is access stratum 22 and non-access stratum 24, a eNB 26 of the radio access network and a core network or operator and maintenance element 28 or, as a second option, simply a core network element 30.

The signalling again commences with a radio access network access restriction activation signal 42 from the core network/operator and maintenance element 28 delivered to the eNB 26 and which provides an indication of type of radio bearer to be barred and, if required, also an access probability factor such as that discussed above in relation to FIG. 1.

Again, in the case of network congestion identified at the eNB 26, the eNB 26 forwards the network policies identifying the type of bearer to be barred to the UE device 22, 24 to activate the required access restrictions.

As before, the eNB 26 delivers the access restriction policies by way of SIB or RRC dedicated configuration signalling 44, again comprising identity of the type of bearer to be barred, and the related access probability factor. To the UE access stratum 22. The received access restrictions are then forwarded from the UE access stratum 22 to the UE non-access stratum 24 by way of signalling 46.

In the alternative option, and which, as compared with the description above represents a non-access stratum based configuration rather than an access stratum based configuration, the UE non-access stratum 24 receives access control configuration signalling 48 directly from a core network element 30 in non-access stratum based configuration the access restrictions are again based upon the type of bearer and associated access probability factor.

However, in both of the access stratum based configuration and non-access stratum based configuration scenarios, the UE checks at its non-access stratum 24 the network policies against any intended mobile originating signalling/data and if such signalling/data is limited to a type of bearer as identified within the access restriction policy the UE non-access stratum 24 does not send the related signalling/data to the UE access stratum 22.

Only if the intended mobile originating signalling/data message passes the access restriction checks, i.e. it is not barred on the basis of bearer type, then the signalling/data is delivered from the UE network access stratum 24 to the UE access stratum 22 by way of signalling 50 and for onward delivery of a Medium Access Control signal 52 to the eNB 26.

Turning now to FIG. 4, there is again illustrated a user terminal device by reference to a UE access stratum 22 and UE non-access stratum 24 and a radio access network represented by an eNB 26 a core network/operator and maintenance element 28 and a sole core network element 30.

Figure 4:
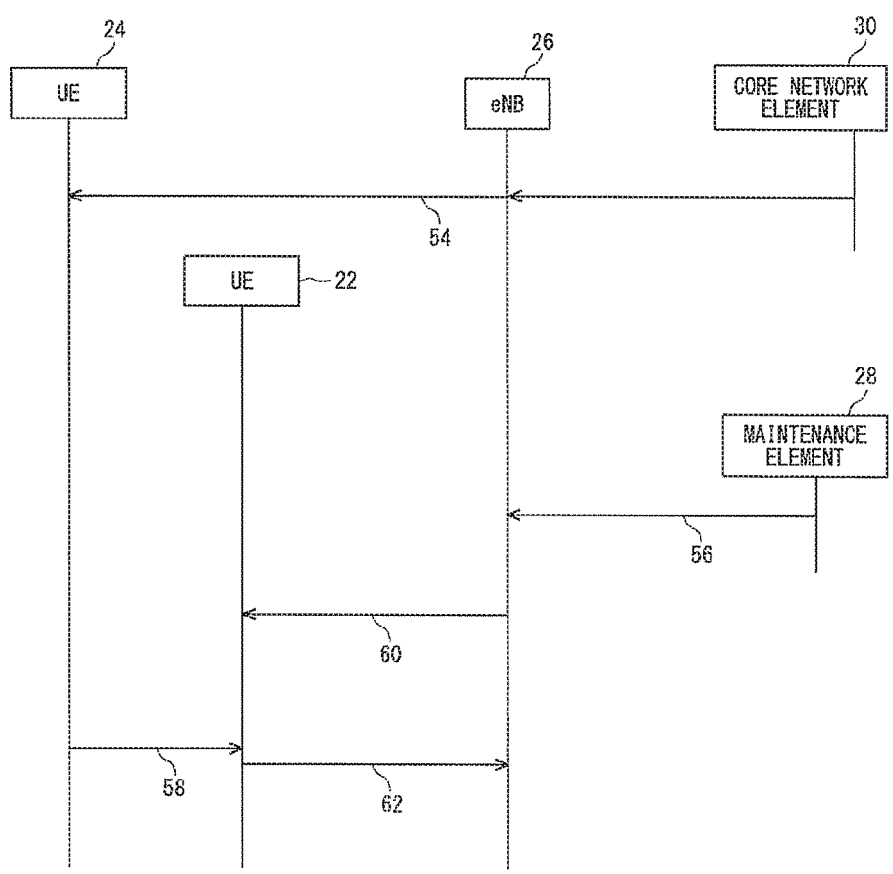
FIG. 4 is a signalling diagram illustrative of network access control according to yet further aspect of the present invention.

The signalling illustrated in FIG. 4 is illustrative of an access restriction example which can be performed depending upon the class of bearer as set by the core network. As will be appreciated from the subsequent discussion effectively two separate checks are applied to the intended mobile originating signalling data delivered to, and arriving at, the UE access stratum 22 before any Medium Access Control request is delivered to the eNB 26.

As part of messaging originating from the core network 30, there is included a bar indicator serving to identify the class of bearers to be barred, for example whether relating to unpaid and/or operator-controlled services such that in the case of network congestion, access requests relating to such bearers would be barred from achieving network access. The barring indicator is delivered to the eNB 26 and then onward by way of a non-access stratum bearer signal 54 to the UE non-access stratum 24 where the network policies including the barring indicator are applied to any required mobile originating signalling/data. If it is determined in the UE non-access stratum 24 that such signalling/data does in fact relate to bearers of a restrictive class then the UE non-access stratum 24 does not send the related signalling/data to the UE access stratum.

If, however, the checks conducted at the UE non-access stratum 24 against the network policies and barring indicator indicate that no such bar should be applied, the related mobile originating signalling/data is delivered by way of signalling 58 to the UE access stratum 22.

However, before a Medium Access Control scheduling request is delivered from the UE access stratum 22 to the eNB 26 a further check is conducted at the UE access stratum 22 having regard to whether the bearer is a new or ongoing bearer, and having regard to an access probability factor, such as a procedure described in relation to FIG. 1.

That is, a radio access network access restriction activation signal can be delivered from the core network/operator and maintenance element 28 to the eNB 26 and, as before, in case of potential network congestion, the eNB 26 can forward the network policies representing the access restriction to the UE. The network policies and access restrictions are delivered by way of SIB signalling 60 to the UE access 22 where such a further check, and possible accessing barring can be conducted on any mobile originating signalling/data that successfully overcame the barring applied at the UE access 24 on the basis of bearer class. Should such mobile originating signalling/data arriving at the UE access stratum 22 also pass the access restriction tests applied on the basis of the restrictions to new or ongoing bearers, and related access probability factor according to the access restrictions represented in SIB signalling 60, then a Medium Access Control signal 26 can finally be delivered to the eNB 26.

As should therefore be appreciated, the present invention is advantageously insofar as, with a UE device in RRC_Connected mode it can prove possible to control the barring of access of the device to the network in a manner to ease network congestion so as to allow sufficient capacity for the delivery of essential communication signals which might commonly comprised packet-based communication applications such as disaster message board services and/or disaster voice messaging services.

The particular efficiencies and effectiveness of the present invention are particularly emphasised through the manner of access control as arising in the radio access network.

Figure 5:
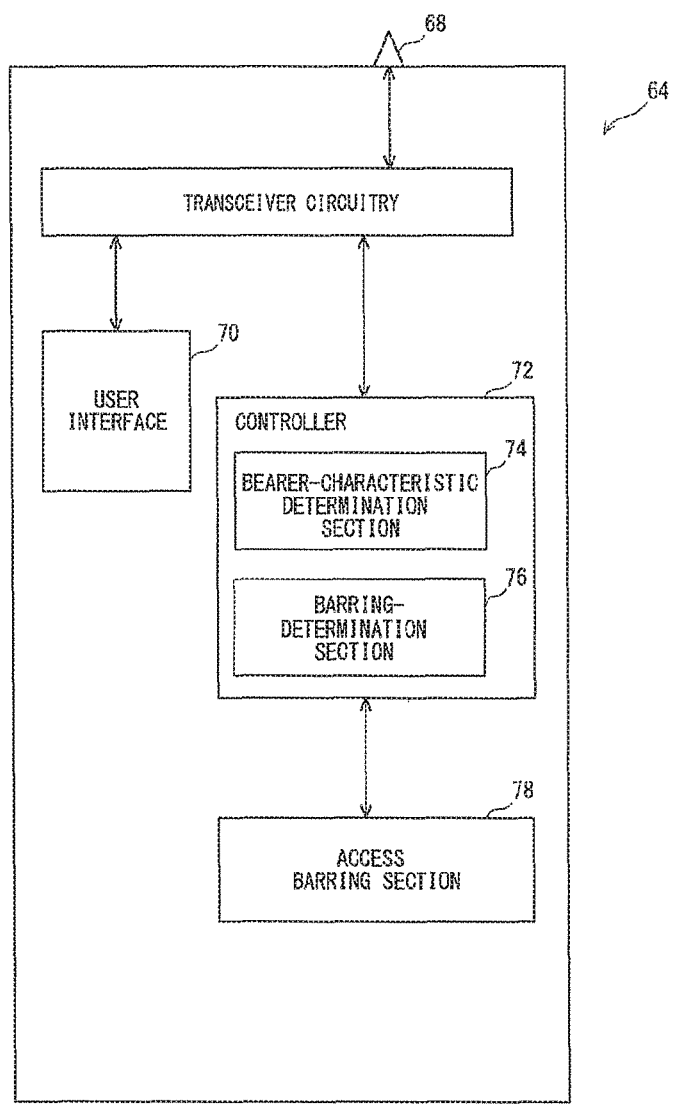
FIG. 5 is a schematic representation of a mobile radio communications device arranged to operate in accordance with an embodiment of the present invention.

Turning now to FIG. 5, there is provided a schematic representation of a mobile radio communications device such as a UE handset 64 including transceiver circuitry 66 operatively connected as shown to an antenna 68 and also operatively connected as shown to a user interface 70 and a controller 72 for controlling network access attempts.

In accordance with an embodiment of the present invention, the controller 72 includes a bearer-characteristic determination section 74 allowing the UE 64 to determine a bearer characteristic of intended MO signalling/data requiring network access. The controller 72 also includes a barring-determination section 76, arranged to receive barring indicators from the RAN at the UE's AS or NAS as appropriate, which indicators are arranged to identify characteristics of bearers to be barred. Thus, if it is determined through combined operation of the sections 74 and 76 that the UE 64 is to attempt network access for MO signalling/data via a bearer that should be barred by access barring section 78, no such attempt is made so as to ease potential network congestion/overload and leave network capacity for potential packet-switched emergency services/applications.

Figure 6:
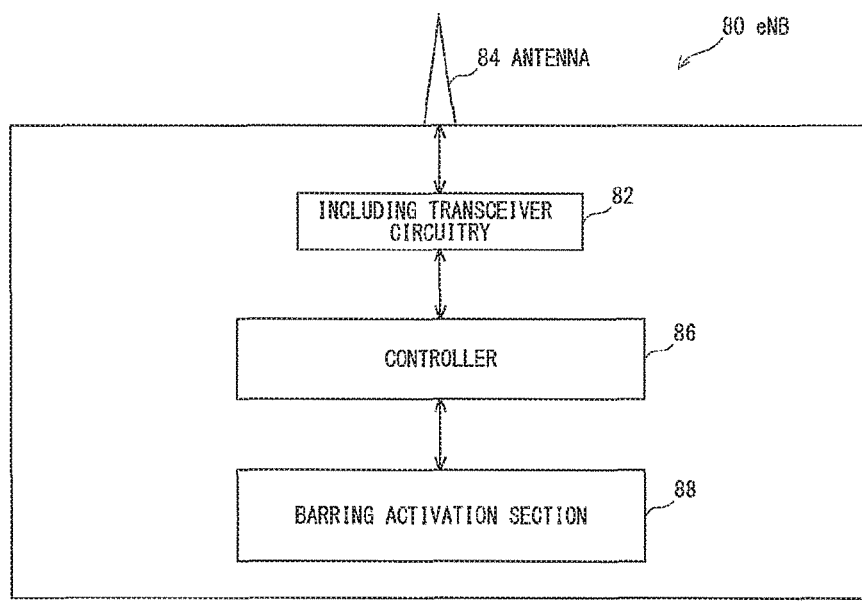
FIG. 6 is a schematic representation of a radio access network device arranged to operate in accordance with an embodiment of the present invention.

Turning now to FIG. 6, there is provided a schematic representation of a mobile radio communications network RAN device such as, for example, an eNB 80 of an LTE network and including transceiver circuitry 82 operatively connected to an antenna 84 and a controller 86.

Within the illustrated embodiment of the eNB 80, the controller 86 is arranged to identify at least one characteristic of a bearer that should not be employed in, i.e. be barred from, network access at a UE device (such as that 64 of FIG. 5) and to deliver signalling, such as for example SIB or RRC Dedicated Configuration, to the UE device accordingly. The identification of the relevant characteristic can occur within the eNodeB 80 or be received from a CN or OAM element and the barring protocol activated within a barring activation section 88.

As will be appreciated from the above, the relevant characteristic can comprise any one or more of identification of new or on-going bearers, bearer service quality, bearer type and/or bearer class, but is in no way restricted to such examples. The barring policy can be configured beforehand in Non Access Stratum based on some relevant characteristic. Then when the congestion or overload situation in the network happens, the Radio Access Network can provide an indication towards the UE so that the latter activates the barring policy in NAS.

In any case, it should however be appreciated that the invention is not restricted to the specific details of the embodiments illustrated with reference to FIGS. 5 and 6. In particular, the UE device can include any appropriate further or alternative functionality for its required network connectivity and level of service, and the network device can comprise any appropriate network node device having regard to the particular Radio Access Technology to be employed.

This application is based upon and claims the benefit of priority from United Kingdom Patent Application No. 1317036.0, filed on Sep. 25, 2013, the disclosure of which is incorporated herein in its entirety by reference.

REFERENCE SIGNS LIST

10 UE
12 ENB
14 CORE NETWORK OR OPERATOR AND MAINTENANCE ELEMENT
16 RADIO ACCESS NETWORK ACCESS RESTRICTION ACTIVATION SIGNAL
18 SIB, OR RRC DEDICATED CONFIGURATION SIGNALLING
20 MEDIUM ACCESS CONTROL SIGNAL
22 UE
24 UE
26 ENB
28 MAINTENANCE ELEMENT
30 CORE NETWORK ELEMENT
32 RADIO ACCESS NETWORK ACCESS RESTRICTION ACTIVATION SIGNAL
34 SIB OR RRC DEDICATED CONFIGURATION
36 SIGNALLING
38 NON-ACCESS STRATUM ACCESS CONTROL CONFIGURATION SIGNALLING
40 ONGOING MEDIUM ACCESS CONTROL SIGNAL
42 RADIO ACCESS NETWORK ACCESS RESTRICTION ACTIVATION SIGNAL
44 SIB OR RRC DEDICATED CONFIGURATION SIGNALING
46 SIGNALLING
48 ACCESS CONTROL CONFIGURATION SIGNALLING
50 SIGNALLING
52 MEDIUM ACCESS CONTROL SIGNAL
54 A NON-ACCESS STRATUM BEARER SIGNAL
56 RADIO ACCESS NETWORK ACCESS RESTRICTION ACTIVATION SIGNAL
58 SIGNALLING
60 SIB SIGNALLING
62 MEDIUM ACCESS CONTROL SIGNAL
64 UE
66 TRANSCEIVER CIRCUITRY
68 ANTENNA
70 USER INTERFACE
72 CONTROLLER
74 BEARER-CHARACTERISTIC DETERMINATION SECTION
76 BARRING-DETERMINATION SECTION
78 ACCESS BARRING SECTION

80 ENB
82 INCLUDING TRANSCEIVER CIRCUITRY
84 ANTENNA
86 CONTROLLER
88 BARRING ACTIVATION SECTION

The invention claimed is:

1. A method of easing congestion in a mobile radio communications network, the method comprising:
   applying an access restriction at a user terminal device towards a radio access network and on a basis of a bearer characteristic that is a characteristic of a first bearer established between the user terminal device and the radio access network; and
   receiving, from the radio access network, network access policies indicating whether a further access using the first bearer is barred, wherein:
   the access restriction includes releasing one or more dedicated radio resources for the user terminal device that has a radio connection with the radio access network,
   an access control data including an assignment of access priority based on bearer classes is provided to the user terminal device, and
   the method further comprises:
      releasing the one or more dedicated radio resources for the user terminal device that has the radio connection with the radio access network in response to determining that the network access policies indicate that the further access using the first bearer is barred;
      delivering, by a core network, a barring indicator based on a bearer class to a non-access stratum of the user terminal device by way of the radio access network; and
      applying a further level of a network access restriction based upon an identification of the first bearer or a second bearer in combination with an access probability factor.

2. The method according to claim 1, further comprising:
   providing a radio access network configuration for the user terminal device.

3. The method according to claim 1,
   wherein the access control data including a radio access barring flag for the second bearer is provided to the user terminal device.

4. The method according to claim 3,
   wherein the access control data includes an access probability factor.

5. The method according to claim 4, further comprising:
   comparing the access probability factor with a randomly generated number,
   wherein applying the access restriction includes applying the access restriction based on a comparison result.

6. The method according to claim 3,
   wherein the access control data includes a network access priority applied based on quality of service of the second bearer.

7. The method according to claim 6,
   wherein the network access priority is configured as an access priority bitmap based on Quality of service Class Identified.

8. The method according to claim 1, wherein
   the access control data includes a radio access barring flag for the first bearer established between the user terminal device and
   the radio access network is provided to the user terminal device.

9. The method according to claim 1,
   wherein the access restriction towards the radio access network includes a provision of an access priority based upon a bearer type.

10. The method according to claim 1, wherein the method is implemented within a mobile radio communications network device for controlling access of the user terminal device to the radio access network, and the method further comprises:
    providing a barring flag for the second bearer from the mobile radio communications network device.

11. The method according to claim 1, wherein the method is implemented within a mobile radio communications network device for controlling access of the user terminal device to the radio access network, and the method further comprises:
    providing a radio access barring flag for the first bearer from the mobile radio communications network device, wherein the first bearer is established between the user terminal device and the radio access network.

12. The method according to claim 1, wherein the method is implemented within a mobile radio communications network device for controlling access of the user terminal device to the radio access network, and the method further comprises:
    providing an access probability factor for the control of the access restriction.

13. The method according to claim 1,
    wherein the method is implemented within a mobile radio communications network device provided at the radio access network.

14. The method according to claim 1, wherein:
    the method is implemented within a mobile radio communications network device for controlling access of the user terminal device to the radio access network; and
    the controlling access includes establishing a network access priority and controlling access based on quality of service of the second bearer.

15. The method according to claim 14, further comprising:
    configuring the network access priority as an access priority bitmap based on the quality of service indicators.

16. The method according to claim 1, wherein the method is implemented within a mobile radio communications network device for controlling access of the user terminal device to the radio access network, and the method further comprises:
    within a provision of the access control towards the radio access network, assigning an access priority based upon a bearer type.

17. An access-control method within a user terminal device for an access restriction towards a radio access network so as to ease congestion within the radio access network, the access-control method comprising:
    applying an access restriction to the radio access network based on a bearer characteristic that is a characteristic of a first bearer established between the user terminal device and the radio access network; and
    receiving, from the radio access network, network access policies indicating whether a further access using the first bearer is barred, wherein:
    the access restriction includes:
       releasing one or more dedicated radio resources for the user terminal device that has a radio connection with the radio access network, the method further comprises:
  releasing the one or more dedicated radio resources for the user terminal device that has the radio connection with the radio access network in response to determining that the network access policies indicate that the further access using the first bearer is barred;
  receiving at a non-access stratum level an access barring indicator based on bearer classes; and
  providing a further level of a network access restriction based upon an identification of a second bearer or the first bearer in combination with an access probability factor.

18. The access-control method according to claim 17, further comprising:
  configuring the user terminal device by way of the radio access network.

19. The access-control method according to claim 17, further comprising:
  receiving a radio access barring flag for the second bearer or a radio access barring flag for the first bearer established between the user terminal device and the radio access network, and
  determining if its mobile originating signaling/data is related to the second bearer or the first bearer established between the user terminal device and the radio access network.

20. The access-control method according to claim 17, further comprising:
  comparing an access probability factor received from the radio access network with a randomly generated number, and
  controlling the deployment of the access restriction based on a comparison result.

21. The access-control method according to claim 17, wherein the access restriction towards the radio access network includes determining a bearer type.

22. A user terminal device comprising a hardware controller configured for an access control towards a radio access network so as to ease congestion within the radio access network, wherein the hardware controller is configured to:
  apply an access restriction to the radio access network based on a bearer characteristic that is a characteristic of a first bearer established between the user terminal device and the radio access network, and
  receive, from the radio access network, network access policies indicating whether a further access using the first bearer is barred, wherein:
  the hardware controller being configured to apply the access restriction includes the hardware controller being configured to:
    release one or more dedicated radio resources for the user terminal device that has a radio connection with the radio access network, and
  the hardware controller is further configured to:
    release the one or more dedicated radio resources for the user terminal device that has the radio connection with the radio access network in response to determining that the network access policies indicate that the further access using the first bearer is barred;
    receive at a non-access stratum level an access barring indicator based on bearer classes; and
    provide a further level of a network access restriction based upon an identification of a second bearer or the first bearer in combination with an access probability factor.

23. A user terminal device comprising a hardware controller configured for an access control towards a radio access network so as to ease congestion within the radio access network, wherein the hardware controller is configured to:
  perform at least one of:
    applying an access restriction to the radio access network based on a bearer characteristic that is a characteristic of a first bearer established between the user terminal device and the radio access network; or
    receiving, from the radio access network, network access policies indicating whether a further access using the first bearer is barred;
  receive at a non-access stratum level an access barring indicator based on bearer classes; and
  provide a further level of a network access restriction based upon an identification of a second bearer or the first bearer in combination with an access probability factor,
  wherein applying the access restriction includes:
    releasing one or more dedicated radio resources for the user terminal device that has a radio connection with the radio access network, and
    releasing the one or more dedicated radio resources for the user terminal device that has the radio connection with the radio access network in response to determining that the network access policies indicate that the further access using the first bearer is barred.

24. A mobile radio communications network device comprising a hardware controller for controlling access of a user terminal device to a radio access network for easing congestion within the mobile radio communications network, wherein the hardware controller is configured to:
  apply an access restriction to the user terminal device on a basis of a bearer characteristic that is a characteristic of a first bearer established between the user terminal device and the radio access network; and
  receive, from the radio access network, network access policies indicating whether a further access using the first bearer is barred, wherein:
  the hardware controller being configured to apply the access restriction includes the hardware controller being configured to:
    release one or more dedicated radio resources for the user terminal device that has a radio connection with the radio access network; and
    an access control data including an assignment of access priority based on bearer classes is provided to the user terminal device, and
  the hardware controller is further configured to:
    release the one or more dedicated radio resources for the user terminal device that has the radio connection with the radio access network in response to determining that the network access policies indicate that the further access using the first bearer is barred;
    deliver, by a core network, a barring indicator based on a bearer class to a non-access stratum of the user terminal device by way of the radio access network; and
    apply a further level of a network access restriction based upon an identification of the first bearer or a second bearer in combination with an access probability factor.

25. A mobile radio communications network comprising:
a user terminal device comprising a hardware controller configured to:

apply an access restriction to the radio access network based on a bearer characteristic that is a characteristic of a first bearer established between the user terminal device and the radio access network, and receive, from the radio access network, network access policies indicating whether a further access using the first bearer is barred, wherein:

the terminal device hardware controller being configured to apply the access restriction includes the terminal device hardware controller being configured to:

release one or more dedicated radio resources for the user terminal device that has a radio connection with the radio access network, and the terminal device hardware controller is further configured to:

release the one or more dedicated radio resources for the user terminal device that has the radio connection with the radio access network in response to determining that the network access policies indicate that the further access using the first bearer is barred; and a mobile radio communications network device comprising a network device hardware controller configured to:

apply the access restriction to the user terminal device on a basis of a bearer characteristic that is a characteristic of the first bearer established between the user terminal device and the radio access network, and receive, from the radio access network, the network access policies indicating whether the further access using the first bearer is barred, wherein:

the network device hardware controller being configured to apply the access restriction includes the network device hardware controller being configured to:

release the one or more dedicated radio resources for the user terminal device that has the radio connection with the radio access network; and an access control data including an assignment of access priority based on bearer classes is provided to the user terminal device, and the network device hardware controller is further configured to:

release the one or more dedicated radio resources for the user terminal device that has the radio connection with the radio access network in response to determining that the network access policies indicate that the further access using the first bearer is barred;

deliver, by a core network, a barring indicator based on a bearer class to a non-access stratum of the user terminal device by way of the radio access network; and apply a further level of a network access restriction based upon an identification of the first bearer or a second bearer in combination with an access probability factor.

* * * * *